US012223460B2

(12) United States Patent
Dragoset et al.

(10) Patent No.: US 12,223,460 B2
(45) Date of Patent: Feb. 11, 2025

(54) PACKAGE DETECTION AND INTELLIGENT SORTING

(71) Applicant: Laitram, L.L.C., Harahan, LA (US)

(72) Inventors: Alexander I. Dragoset, Gretna, LA (US); Jason Lagneaux, Jefferson, LA (US)

(73) Assignee: Laitram, L.L.C., Harahan, LA (US)

( * ) Notice: Subject to any disclaimer, the term of this patent is extended or adjusted under 35 U.S.C. 154(b) by 798 days.

(21) Appl. No.: 17/599,375

(22) PCT Filed: Mar. 16, 2020

(86) PCT No.: PCT/US2020/022969
§ 371 (c)(1),
(2) Date: Sep. 28, 2021

(87) PCT Pub. No.: WO2020/209986
PCT Pub. Date: Oct. 15, 2020

(65) Prior Publication Data
US 2022/0180094 A1 Jun. 9, 2022

Related U.S. Application Data

(60) Provisional application No. 62/831,801, filed on Apr. 10, 2019.

(51) Int. Cl.
*G06Q 10/08* (2024.01)
*B65G 47/14* (2006.01)
*B65G 47/69* (2006.01)

(52) U.S. Cl.
CPC ............. *G06Q 10/08* (2013.01); *B65G 47/14* (2013.01); *B65G 47/69* (2013.01); *B65G 2203/041* (2013.01); *G06F 2218/12* (2023.01)

(58) Field of Classification Search
CPC ........ C06Q 10/08; B65G 47/14; B65G 47/69; B65G 2203/041; G06F 2218/12; G06Q 10/081
See application file for complete search history.

(56) References Cited

U.S. PATENT DOCUMENTS

| | | | |
|---|---|---|---|
| 5,165,520 | A | 11/1992 | Herve et al. |
| 7,505,620 | B2 | 3/2009 | Braune et al. |
| 8,405,721 | B2 | 3/2013 | Bilandi et al. |
| 8,411,930 | B2 | 4/2013 | Ridley et al. |
| 8,867,816 | B2 | 10/2014 | Bouchard et al. |

(Continued)

FOREIGN PATENT DOCUMENTS

WO 2009021650 A1 2/2009

OTHER PUBLICATIONS

CN1100385275 (Year: 2019).*

(Continued)

*Primary Examiner* — Gene O Crawford
*Assistant Examiner* — Lester Rushin, III
(74) *Attorney, Agent, or Firm* — James T. Cronvich

(57) ABSTRACT

A sorting conveyor and a method for sorting packages to selected destinations. A neural network executed by a multi-core classification processor uses captured images of package units conveyed on an infeed conveyor to classify each package unit. A control processor controls a sorting conveyor to direct each package unit to a destination depending on the package unit's classification.

26 Claims, 5 Drawing Sheets

(56) References Cited

U.S. PATENT DOCUMENTS

| | | | |
|---|---|---|---|
| 8,879,791 B2 | 11/2014 | Drouin et al. | |
| 9,192,965 B2* | 11/2015 | Serjeantson | B07C 3/06 |
| 9,771,222 B2* | 9/2017 | Schroader | B65G 43/10 |
| 12,080,015 B2* | 9/2024 | Sangeneni | G06T 7/70 |
| 2014/0166553 A1 | 6/2014 | Enenkel | |
| 2014/0168374 A1 | 6/2014 | Bunkers | |
| 2014/0305850 A1* | 10/2014 | Serjeantson | B07C 3/14 |
| | | | 209/546 |
| 2016/0263623 A1 | 9/2016 | Wojdyla et al. | |
| 2016/0267355 A1* | 9/2016 | Piao | G06F 18/285 |
| 2018/0015506 A1* | 1/2018 | Zatopek | B07C 3/14 |

OTHER PUBLICATIONS

Description Translation (Year: 2019).*
Examination Report, Indian Patent Application No. 202117038418, dated Apr. 19, 2023, Government of India, Intellectual Property India Office, New Delhi.

\* cited by examiner

PACKAGE DETECTION AND INTELLIGENT SORTING

BACKGROUND

The invention relates generally to power-driven conveyors and more particularly to conveyors for classifying packages using artificial intelligence and sorting the packages to destinations depending on their classifications.

In the package-handling industry, sorting conveyors are used to sort individual packages from a bulk flow of randomly oriented and stacked packages of various sizes and shapes. But, before the packages can be sorted to proper destinations, they have to be separated from each other. Conveyors use various techniques to separate the bulk flow into individual packages. Occasionally, however, the conveyors fail to separate all the packages, and manual intervention is required. Oversized boxes can also present problems by causing jams; if recognized, they are removed manually. But oversized polybags, because they are flexible, may not cause jams. So their removal from the sorter reduces overall throughput.

SUMMARY

One version of a conveyor system embodying features of the invention comprises an infeed conveyor segment conveying separated package units downstream in a conveying direction. A package-unit detector detects the package units at a detection position along the infeed conveyor segment. An imaging system captures images of the package units within a target zone of the infeed conveyor segment. A computer processing system executes program instructions to track the position of each of the package units as they are conveyed on the infeed conveyor segment and to provide each of the images of the package units as inputs to a classifier. The classifier is trained to recognize a set of package units and to assign to each of the package units a classification corresponding to one of the members of the set of package units the classifier is trained to recognize. A downstream conveyor segment receives the package units from the infeed conveyor. The computer processing system executes program instructions to control the downstream conveyor segment to convey each package unit depending on the package unit's classification.

Another version of a conveyor system comprises an infeed conveyor segment conveying package units downstream in a conveying direction at a conveying speed. A footprint detector is disposed at a detection position along the infeed conveyor segment. A camera is disposed along the infeed conveyor segment downstream of the detection position to capture an image of a capture area on the infeed conveyor segment. A sorting conveyor segment receives package units from the infeed conveyor segment and selectively sorts the package units to multiple destinations. A control processor executes program instructions to: (1) operate the footprint detector to detect the footprints of the package units advancing past the detection position in the conveying direction; and (2) control the sorting conveyor segment and the infeed conveyor segment. A classification processor in communication with the control processor executes program instructions to: (1) calculate the positions of each of the package units on the infeed conveyor segment as they advance along the conveyor from their footprints detected passing the detection position; (2) control the camera to capture an image of one or more of the package units when the calculated position of one or more of the package units lies within a target zone in the capture area on the infeed conveyor segment to produce an image of the one or more of the package units within the capture area; (3) crop the image into one or more cropped images, each cropped image corresponding to one of the one or more package units within the capture area; and (4) use artificial intelligence to classify the cropped images into a plurality of classifications by assigning one of the classifications to each of the one or more package units. The control processor controls the sorting conveyor segment to sort each of the one or more package units to a destination depending on the package unit's classification.

In another aspect a processor-implemented method for sorting packages conveyed on an infeed conveyor segment comprises: (a) detecting multiple package units advancing at a conveying speed in a conveying direction on an infeed conveyor segment past a detection position; (b) calculating the positions of each of the multiple package units detected passing the detection position on the infeed conveyor segment as they advance along the conveyor; (c) imaging one or more of the multiple package units in an image capture area on the infeed conveyor segment to produce an image of the one or more of the multiple package units within the capture area; (d) cropping the image into one or more cropped images, each cropped image corresponding to one of the one or more multiple package units within the image capture area; (e) classifying the cropped images into a plurality of classifications using artificial intelligence by assigning one of the classifications to each of the one or more multiple package units; and (f) sorting each of the one or more multiple package units to a destination depending on the package unit's classification.

DETAILED DESCRIPTION

Figure 1:
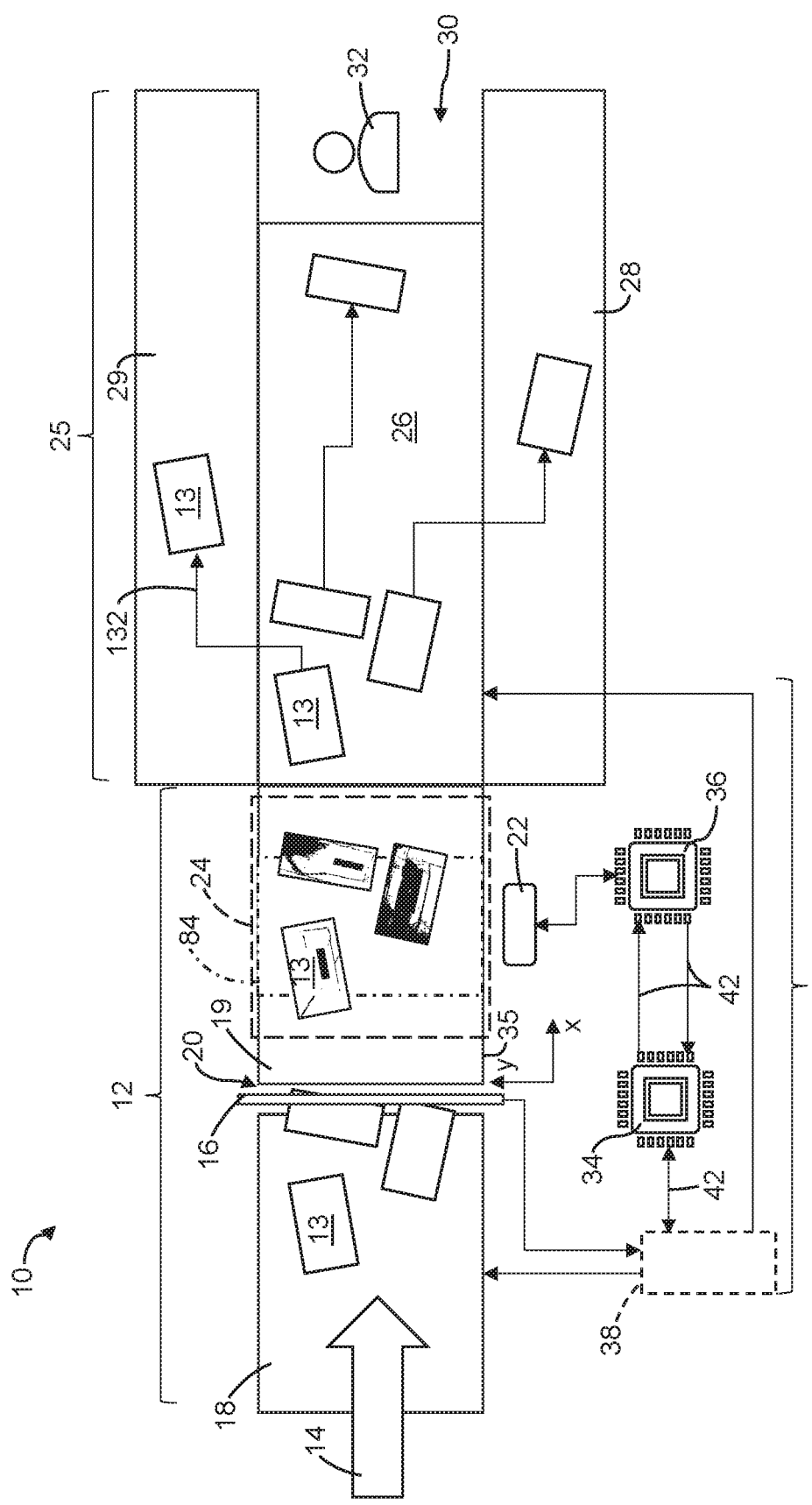
FIG. 1 is a top plan view of a conveying system embodying features of the invention.

A conveyor system embodying features of the invention for sorting packages intelligently is shown in FIG. 1. The conveyor 10 includes an infeed conveyor segment 12 conveying packages 13 downstream in a conveying direction 14. A package-unit detector 16 is positioned along the infeed conveyor segment 12 at a detection position. In this example the infeed conveyor segment 12 is depicted as a series of two conveyors: a first conveyor 18 upstream of the package-unit detector 16 and a second conveyor 19 downstream of the package-unit detector. Both conveyors 18, 19 can be realized as belt conveyors, slat conveyors, chain conveyors, or roller conveyors, for example. The infeed conveyor segment 12 can be realized as a single conveyor or as more than two conveyors. In this two-conveyor version, the package-unit detector 16 emits a curtain of light from a transmitter array through a gap 20 between the two conveyors 18, 19 to a receiver array. The receiver and the transmitter are located on opposite sides of the conveyor segment 12—one below and one above. The resulting light curtain extends across the width of the conveyor segment 12. A package 13 passing through the light curtain blocks the transmitted light beams it intercepts from reaching the receiver array. As the package 13 passes the package-unit detector 16, its footprint, i.e., its projection on the infeed conveyor segment, can be determined from the pattern of blocked receivers. So, in this version, the package-unit detector 16 is a footprint detector. Other kinds of package-unit detectors, such as laser range finders and cameras, can alternatively be used.

An imaging system including a camera 22 is located along the infeed conveyor segment 12 downstream of the package-unit detector 16. The camera 22 has a capture area 24 that covers a stretch of the conveying side of the infeed conveyor segment 12 across its width. The imaging system captures images of the packages 13 passing through the capture area 24. Packages 13 exiting the infeed conveyor segment 12 are received on a downstream sorting conveyor segment 25. The sorting conveyor segment 25 can be realized as a sorting conveyor 26, such as a roller belt with rollers selectively actuated into rotation to divert articles to one of two flanking conveyors 28, 29. The sorting conveyor 26 and the flanking conveyors 28, 29 can be powered-roller conveyors or can be modular-plastic-belt conveyors, as just two examples. And the infeed conveyor segment 12 and the sorting conveyor 26 can be realized by a single conveyor belt. In one version the sorting conveyor 26 is an INTRALOX® Series 7000 activated-roller-belt conveyor manufactured and sold by Intralox, L.L.C., Harahan, Louisiana, U.S.A. The flanking conveyors 28, 29 could likewise be realized by roller belts, flat belts, modular plastic belts, slat conveyors, chutes, or roller conveyors, for example. By selectively actuating its rollers, the sorting conveyor diverts packages to one of three destinations: (1) the right flanking conveyor 28; (2) the left flanking conveyor 29; or (3) a destination 30 shown manned by a human operator 32, who can decide how to dispose the package units received.

The outputs of the footprint detector 16 are sent to a computer processing system 33 that includes a control processor 34 programmed to determine the footprints of packages 13 passing the detector at the detection position. (The computer processing system 33 includes program memory in which constants and program instructions executed by one or more processors are stored and volatile data memory in which calculations, tables, and other temporary or changeable information are stored.) Some packages may not be separated from others. Those overlapping, or stacked, packages have a footprint that can be shaped differently from the footprints of single, separated packages. For this reason, the footprint detector 16 detects the footprints of separated package units that encompass single, separated packages and groups of overlapping, or stacked, packages whose footprints are defined by a single outline.

The control processor 34 executes stored program instructions that define individual footprints of the package units passing the detection position. For example, each footprint can be defined by the coordinates of its corners or by its centroid as calculated by the control processor 34. The position of each package unit on the infeed conveyor can be described at any time by its coordinates in an x-y coordinate system with the detection position as the x=0 reference and the right-side edge 35 of the infeed conveyor segment 12 as the y=0 reference, for example.

In that arbitrary coordinate system, the x axis is parallel to the conveying direction 14, and the y axis is perpendicular to the conveying direction. The control processor 34 can also be programmed to execute tasks that: (a) control the speeds of the infeed conveyor segment 12, the sorting conveyor 26, and the first and second conveyers 28, 29; (b) receive inputs reporting the speeds of the various conveyors; and (c) control the communications network between itself and a classification processor 36 used with the imaging system. Like the control processor 34, the classification processor 36 is included within the computer processing system 33 and may include an external or same-chip graphics processing unit (GPU). The control processor 34, in its interface with the conveyors 12, 26, 28, 29, may exercise control via an external physical programmable logic controller (PLC) 38 or via an internal virtual PLC or may divide control between an external physical PLC and an internal virtual PLC. For example, the external PLC could control the motors driving the infeed and sorting conveyor segments and read sensors reporting belt speed, while the virtual PLC receives the output of the footprint detector. In any case the PLC 38 is considered part of the control processor 34 and part of the computer processing system 33.

The operation of the control processor 34 and the classification processor 36 is described in reference to the flowcharts of FIGS. 2-5.

Figure 3:
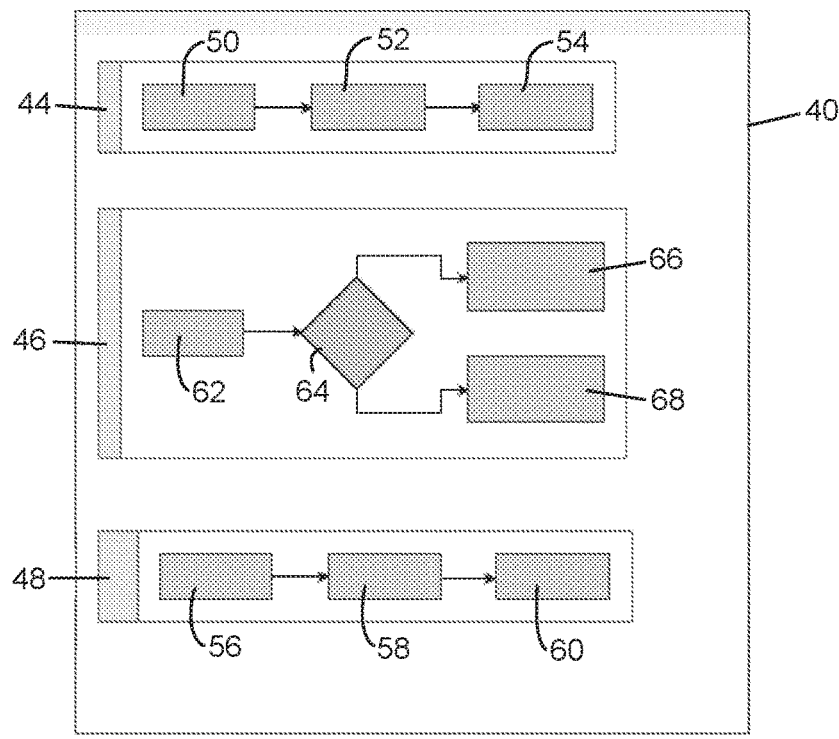
FIG. 3 is an enlarged flowchart of the TCP connection management task of FIG. 2.

The TCP (transmission control protocol) connection manager task 40 executed by the control processor 34 (FIG. 1) is shown in more detail in FIG. 3. The task controls the communication network 42 (FIG. 1) over which the control processor 34, the classification processor 36, and the PLC 38 communicate. The TCP connection manager task 40 has three subtasks: (1) a read task 44; (2) a connection monitor task 46; and (3) a write event handler task 48.

The read task 44 reads a message 50, parses the message 52, and executes the message 54. In the case of a message from the control processor 34 that a footprint corresponding to a package unit has been identified by the footprint detector, an item corresponding to that footprint and its coordinates is added to an infeed conveyor state table that represents the most recently calculated positions of all the identified footprints of package units in the infeed conveyor 19 downstream of the detection position.

The write event handler 48 handles any events that have occurred 56, frames a message indicating the occurrence of that event along with any pertinent data about the event 58, and sends the message frame 60 over the communication network to be read by the intended recipients. An example is described later.

The connection monitor task 46 checks to make sure that all the devices, or nodes, e.g., the control processor 34, the classification processor 36, and the PLC 38 are connected. The task sends out 62 a heartbeat message over the communications network. The task determines 64 if the message was received by the intended recipient devices. If there is no message send failure, the control processor knows that the network is intact 66. If there is a send failure, the control processor attempts to reconnect 68 to the disconnected device.

Figure 2:
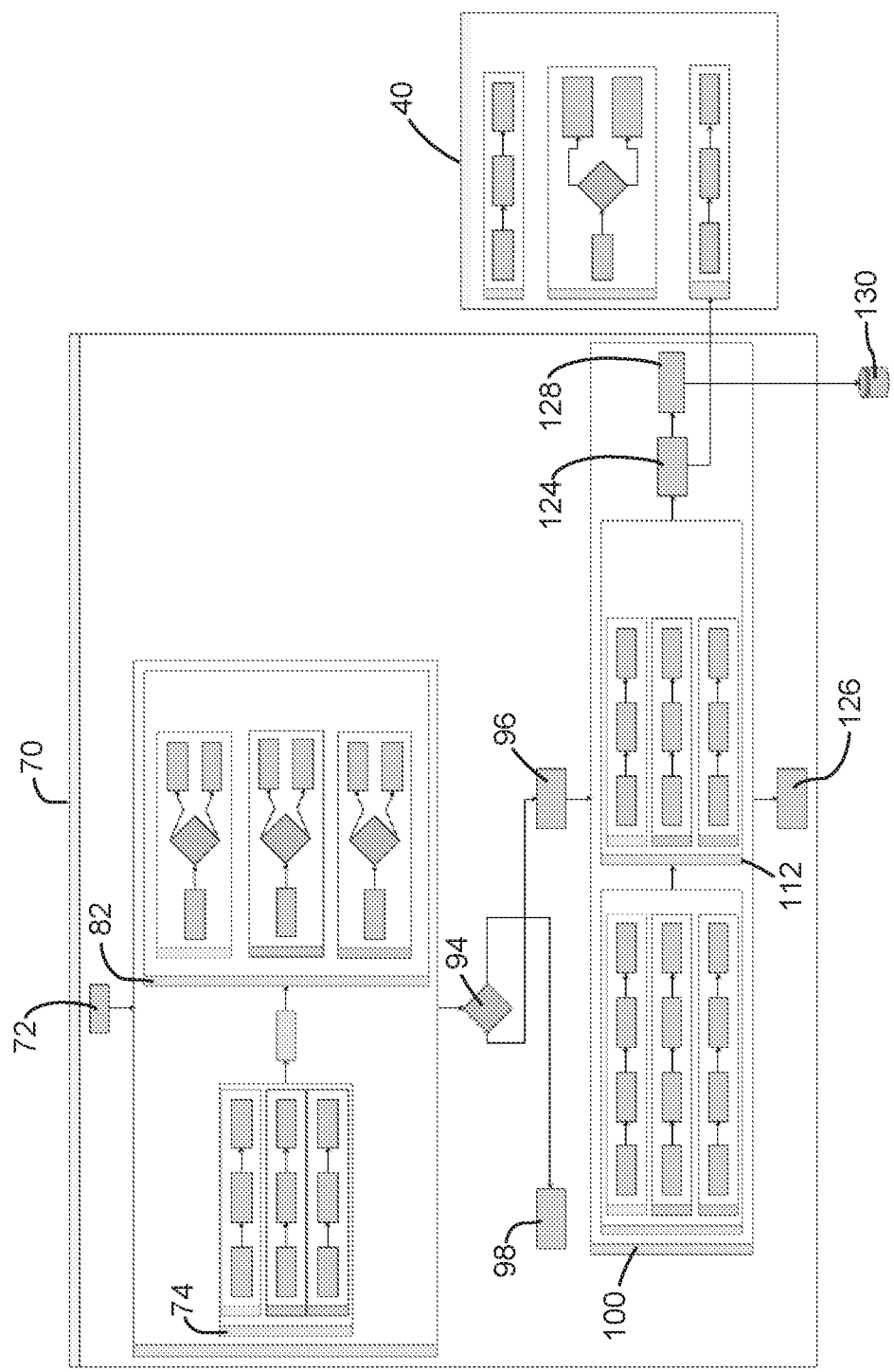
FIG. 2 is a flowchart of program instructions executed by a multi-core classification processor and a control processor for a conveyor system as in FIG. 1.

The classification processor 36 executes stored program instructions that include a timer-tick task 70, as shown in FIG. 2, at a periodic rate, e.g. every 75 ms, as set by a timer. The timer-tick task 70 bids several subtasks that track package units on the infeed conveyor segment, capture images of the package units, and classify the package units. First, the timer-tick task 70 cleans up 72 old subtasks and readies them for fresh execution. The classification processor 36 executes package-tracking tasks 74 for each of the package-unit-identifying footprints in the infeed conveyor state table. The classification processor 36 in this version has multiple cores that allow it to execute the package-tracking tasks 74 simultaneously in parallel. The task for each detected package unit runs in one or another of the cores or in a dedicated thread in a core running multiple threads. The parallel execution of the package-tracking tasks 74 and of subsequent tasks in separate cores or threads allows the conveyor system to handle high package-throughput rates. Likewise, the control processor 34 could be a multi-core processor.

Figure 4:
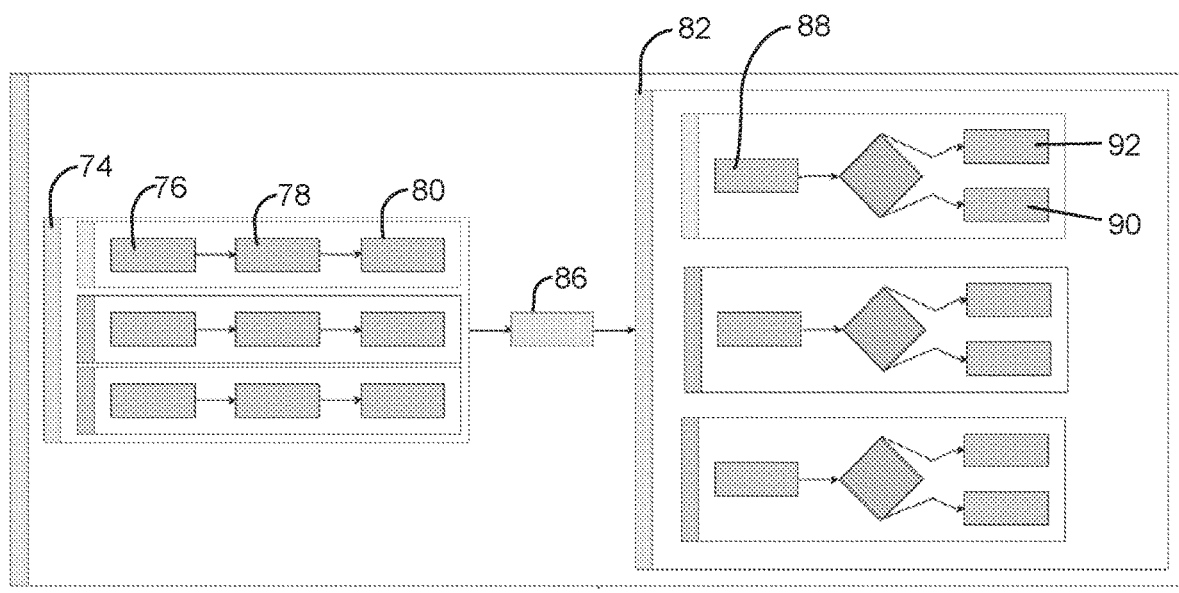
FIG. 4 is an enlarged flowchart of the package-tracking task of FIG. 2.

As shown in more detail in FIG. 4, the package-tracking task 74 for each package unit on the infeed conveyor segment calculates 76 the time interval since it previously ran for that package unit. With knowledge of the conveying speed, the task 74 calculates 78 the distance the package unit has advanced in the conveying direction since the last update and updates 80 the coordinates of the package unit's position to its current position.

After the positions of the package units have been updated, the multi-core classification processor 36 (FIG. 1) executes in parallel in-target tasks 82 that determine when a package unit lies in a target zone 84 within the image capture area 24 so that the camera 22 can be operated to capture an image of the package units in the target zone. Before executing the in-target tasks 82, the classification processor 36 first limits 86 the execution of the in-target tasks to those package units that have not yet been imaged.

Each of the in-target tasks 82 first determines 88 whether the package unit lies within the target zone 84 (FIG. 1) by comparing its coordinates with the coordinate range of the target zone. If the package unit is determined to lie within the target zone, the task adds the package unit to a target list 90; otherwise, no action is taken 92. The classification processor then checks 94 the target list as shown in FIG. 2. If one or more package units have been freshly added to the target list, the classification processor 36 signals 96 the camera 22 (FIG. 1) to capture an image of the package unit or units in the target zone 84. If no fresh package units are in the target list, no action is taken 98 and the timer-tick task 70 is completed.

Figure 5:
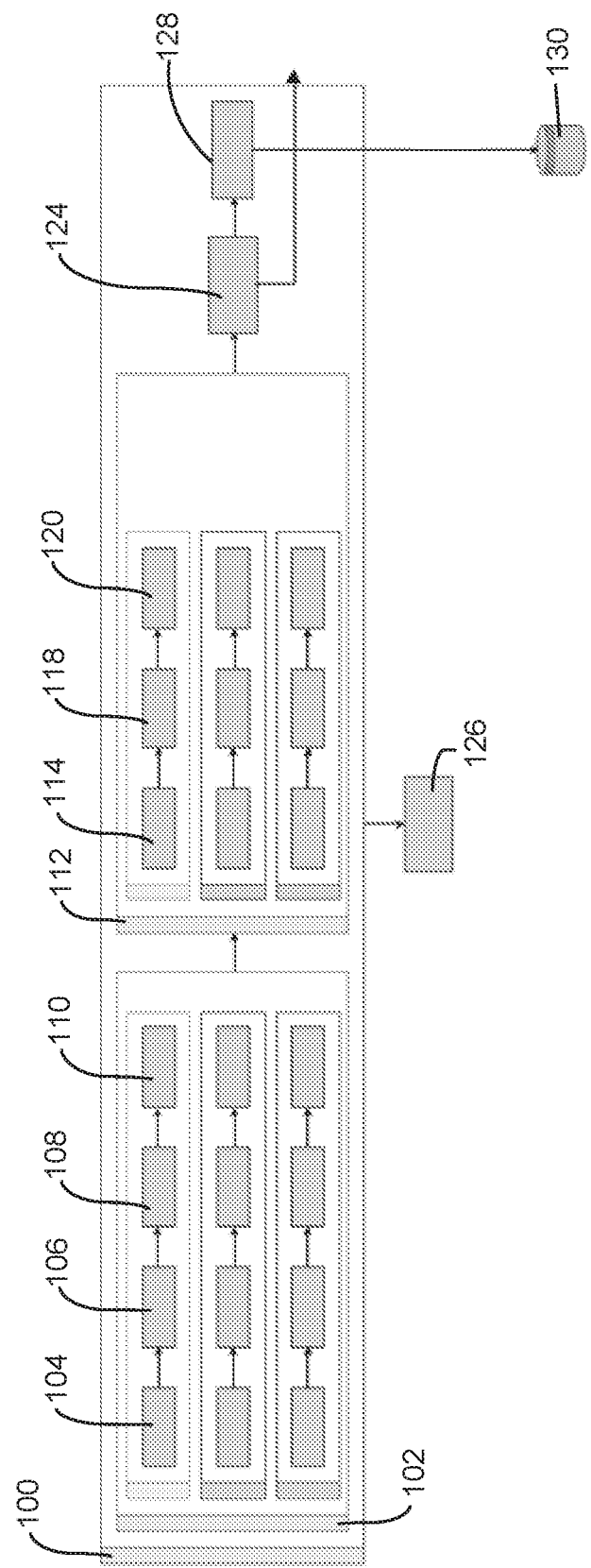
FIG. 5 is an enlarged flowchart of the image processing and package classification tasks of FIG. 2.

With every fresh image, the classification processor 36 executes in parallel process-target tasks 100 shown in detail in FIG. 5. Each process-target task 100 includes an image-crop task 102 that first calculates 104 the relative pixel coordinates of the package unit in the captured image. For example, the pixel coordinates of the corners of the package unit can be used as the relative pixel coordinates. Based on those coordinates, the image-crop task 102 then performs a coordinate rotation 106 of the image containing the package unit to orient it for effective cropping. The coordinate rotation results in rotated coordinates for the package unit in the captured image. The rotated captured image is then cropped 108 into smaller rectangular regions encompassing each of the rotated package-unit images in the captured image. The pixels in the rectangular region define a cropped image, which are then stored 110.

Classification tasks 112 are executed by the classification processor's cores in parallel for each of the cropped images. Each cropped image comprises a rectangular pixel array of one-byte (0-255) RGB values. First, each classification task 112 preprocesses 114 the cropped image to format it for the specific classification program being used. For example, the dimensions of the pixel array may have to be changed and padded with zeros to fill the array. Examples of classification programs are: AlexNet; Inception Network v1, v2, v3, v4; MobileNet; PNASNet; SqueezeNet; and ResNet. The pixel array is supplied as inputs P to a neural network 116 (FIG. 6), which classifies 118 (FIG. 5) the cropped image of the package unit. Once the package unit has been classified, the classification task stores 120 the classification in the infeed conveyor state table.

Figure 6:
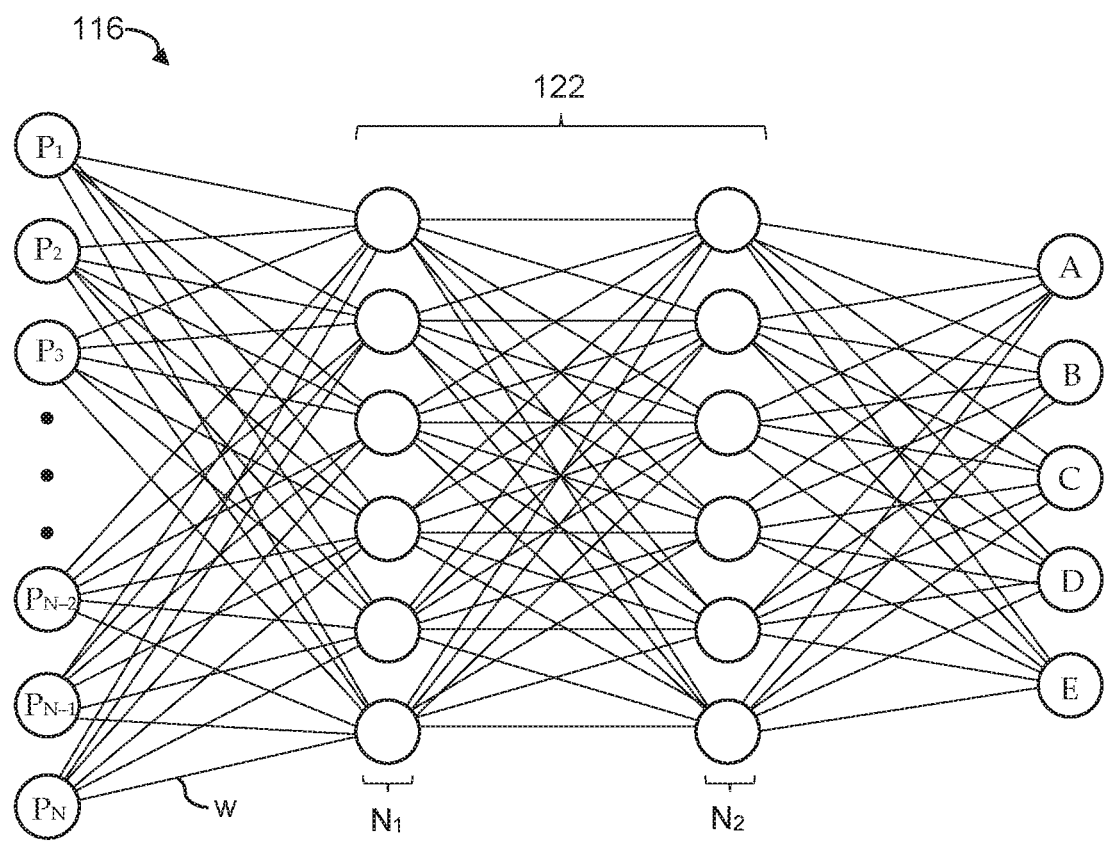
FIG. 6 is a schematic diagram of an illustrative neural network used to help explain the operation of a neural network usable in a conveyor system as in FIG. 1.

In this version the classification processor uses artificial intelligence in the form of a neural network as a classifier. But other artificial-intelligence techniques, such as Haar feature-based cascade classifier, fully connected networks, convolutional neural networks, support vector machines, Bayesian neural networks, k-NN networks, Parzen neural networks, and fuzzy logic, could be used as classifiers to classify images of package units. The neural network 116 in FIG. 6 represents an illustrative neural network to explain how artificial intelligence is used to classify the package units. The inputs P are the RGB values of the pixels in the pixel array of the preprocessed cropped image. The inputs are multiplied by different weighting factors w associated with each line connecting the inputs P to a first layer of neurons N1 in a hidden layer 122. Each neuron N1 in the first layer has a value, or activation, equal to the normalized sum of the products of the weights and the input values P connected to it plus a bias term. Normalization is achieved by a mathematical function that maps the sum into a limited range, e.g., from 0 to 1. In a similar way the activations of the first hidden layer N1 are applied to a second hidden layer of neurons N2. And the activations of the neurons N2 in the second hidden layer are used to compute outputs (A-E). The actual neural network used to classify the package units could have more than two hidden layers of more or less than the six neurons shown for each hidden layer.

The outputs A-E represent a set of various classifications of the package units. The classification task assigns each package unit the classification that has the greatest activation value of the five outputs. For example, A=a polybag; B=a recognized single package that is not a polybag; C=a stack of packages with less than a predetermined percentage (e.g., 25%) of overlap; D=a stack of packages with more than the predetermined percentage of overlap; and E=an unrecognized package. Of course, other package-unit classification sets could be used to identify other package types or package characteristics, such as surface texture, rips and tears, wet spots, specific colors, specific visible indicia, and crumpled polybags with illegible machine-readable indicia, such as bar codes.

The neural-network classifier is trained by feeding the network numerous cropped images of package units corresponding to the output classifications. The training adjusts the weights w and the biases for each layer of neurons to minimize the cost function—the difference between the desired outputs for the image (0 for all outputs except for the output corresponding to the image, which is 1) and the outputs computed by the neural network. The training process iteratively adjusts the weights and biases for each training image by conventional back-propagation techniques. The training is typically performed offline and not in realtime.

As shown in FIG. 5, the classification determined by the neural network for each package unit is sent 124 to the control processor, and invalid and previously classified package units are removed 126 from the table of items to be classified. Metadata, such as the cropped image, a time stamp, and the pixel coordinates of the package unit, are sent 128 to storage 130 for offline analysis.

The control processor 34 in FIG. 1 checks the positions of the package units 13 on the infeed conveyor segment 12 as updated by the classification processor's package-tracking task. Once the package units 13 reach the sorting conveyor segment 25, the control processor 34 takes over calculating the position of each package unit and determining its destination and trajectory. The destination of each package unit depends on its classification. For example, unrecognized package units (classification E) and stacked packages with more than 25% overlap (classification D) are sent to a destination 30 manned by a human operator 32. Any package units of any classification that exceed a predetermined maximum size could also be sent to the manned destination 30. In this version the trajectory of those package units is straight in the conveying direction 14. Polybags (classification A), recognized single packages not polybags (classification B), and stacked packages with less than 25% overlap (classification C) are diverted to sort destinations on one or the other of the flanking conveyors 28, 29, which convey the packages downstream for further processing. To control the trajectory 132 of each package unit 13, the control processor 34 selectively actuates sections of rollers in a roller belt or a powered-roller conveyor or shoes in a shoe sorter or pushers to divert the package units to the designated destinations.

The invention has been described in detail with respect to an exemplary version using a computer processing system that includes two processors and a PLC. That system provides redundancy in case the classification processor fails. If that happens, the control processor can sort packages based on the footprints of the package units alone without the added benefit of their classifications. And if the control processor fails, the PLC can simply sort packages to produce a balanced flow on the two flanking conveyors temporarily manned by human operators until the control processor is back on line. But other versions are possible. For example, the control processor and the classification processor could be realized by a single multi-core processor in the computer processing system. As another example, the classification processor does not have to be a multi-core processor executing task instructions in parallel in individual cores or threads. It could be a single-core processor executing one task instruction at a time.

In an alternative version the image capture area of the camera could be positioned along the infeed conveyor segment upstream of the footprint detector. In that case that classification processor would execute tasks that continually capture images and store the captured images with a time stamp in an image table in the processor's volatile memory. The control processor would detect footprints with the footprint detector downstream of the image capture area. With knowledge of the speed of the infeed conveyor and the distance from the image capture area to the footprint detection position, the classification processor would associate each footprint with a package-unit image contained in a captured image in the image table. The classification processor would then rotate, crop, preprocess, and classify the package unit as in FIG. 5 before the package unit exits the infeed conveyor segment and enters the sorting conveyor segment.

It would also be possible to use the imaging system as a footprint detector to detect the footprints or the positions of package units and dispense with a separate dedicated footprint detector. The classification processor, besides executing the tasks required to classify the package units from their images, would execute tasks that serve as a package-unit detector by recognizing individual package units and tracking their positions as they advance along the infeed conveyor segment so that they can be sorted to their assigned destinations.

What is claimed is:

1. A conveyor system comprising:
   an infeed conveyor segment conveying separated package units downstream in a conveying direction;
   a package-unit detector detecting the package units at a detection position along the infeed conveyor segment, wherein the package-unit detector detects the footprints of the package units;
   an imaging system capturing images of the package units within a target zone of the infeed conveyor segment;
   a computer processing system executing program instructions to track the position of each of the package units as they are conveyed on the infeed conveyor segment and to provide each of the images of the package units as inputs to a classifier trained to recognize a set of package units and to assign to each of the package units a classification corresponding to one of the members of the set of package units the classifier is trained to recognize;
   a downstream conveyor segment receiving the package units from the infeed conveyor segment;
   wherein the computer processing system executes program instructions to control the downstream conveyor segment to convey each package unit depending on the package unit's classification.

2. A conveyor system as claimed in claim 1 wherein the computer processing system executes program instructions to:
   calculate the positions of each of the package units on the infeed conveyor segment as they advance along the conveyor from their footprints detected passing the detection position;
   control the imaging system to capture an image of one or more of the package units when the calculated position of one or more of the package units lies within the target zone on the infeed conveyor segment to produce an image of the one or more of the package units within the target zone;
   crop the image into one or more cropped images, each cropped image corresponding to one of the one or more package units within the target zone;
   classify the cropped images into one of the classifications.

3. A conveyor system as claimed in claim 2 wherein the computer processing system computes coordinates of the centroids of the detected footprints wherein the centroids define the positions of the package units on the infeed conveyor segment.

4. A conveyor system as claimed in claim 2 wherein the computer processing system rotates the images to a non-oblique orientation relative to the conveying direction before cropping the images.

5. A conveyor system as claimed in claim 2 wherein the computer processing system includes a multi-core processor having multiple cores executing program instructions in parallel.

6. A conveyor system as claimed in claim 1 wherein the computer processing system includes a first processor and a second processor that controls the downstream conveyor segment to sort each of the package units to one of a plurality of destinations depending on the package unit's classification.

7. A conveyor system as claimed in claim 6 wherein the set of package units the classifier is trained to recognize are:
(a) a polybag; (b) a recognized single package not a polybag;

(c) a stack of packages with less than a predetermined percentage of overlap; and (d) a stack of packages with more than the predetermined percentage of overlap.

8. A conveyor system as claimed in claim 7 wherein the second processor controls the sorter to sort package units classified as a stack of packages with more than the predetermined percentage of overlap or as an unrecognized package unit to a destination manned by a human operator.

9. A conveyor system as claimed in claim 7 wherein the second processor controls the sorter to sort package units classified as a recognized single package or as a stack of packages with less than the predetermined percentage of overlap to a downstream destination for further processing.

10. A processor-implemented method for sorting packages conveyed on an infeed conveyor segment, the method comprising:
   (a) detecting the footprints of multiple package units advancing at a conveying speed in a conveying direction on an infeed conveyor segment past a detection position;
   (b) calculating the positions of each of the multiple package units detected passing the detection position on the infeed conveyor segment as they advance along the conveyor;
   (c) imaging one or more of the multiple package units in an image capture area on the infeed conveyor segment to produce an image of the one or more of the multiple package units within the capture area;
   (d) cropping the image into one or more cropped images, each cropped image corresponding to one of the one or more multiple package units within the image capture area;
   (e) classifying the cropped images into a plurality of classifications using artificial intelligence by assigning one of the classifications to each of the one or more multiple package units;
   (f) sorting each of the one or more multiple package units to a destination depending on the package unit's classification.

11. The method of claim 10 comprising executing steps (b)-(e) in parallel in a multi-core processor.

12. The method of claim 11 comprising steps (a) and (f) in a separate control processor in communication with the multi-core processor.

13. The method of claim 12 wherein the multi-core processor sends the classification assigned to each of the one or more multiple package units to the control processor.

14. The method of claim 10 wherein the package units are classified as: (a) a polybag; (b) a recognized single package not a polybag; (c) a stack of packages with less than a predetermined percentage of overlap; (d) a stack of packages with more than the predetermined percentage of overlap; and (e) an unrecognized package unit.

15. The method of claim 14 comprising sorting package units classified as a stack of packages with more than the predetermined percentage of overlap or as an unrecognized package unit to a destination manned by a human operator.

16. The method of claim 14 comprising sorting package units having a footprint greater than a predetermined footprint size to a destination manned by a human operator.

17. The method of claim 14 comprising sorting package units classified as a recognized single package or as a stack of packages with less than the predetermined percentage of overlap onto a conveyor conveying the package unit to further processing.

18. The method of claim 10 wherein the classifying is performed by a neural network trained to recognize package units of various kinds.

19. The method of claim 10 comprising computing coordinates of the corners of the detected footprints.

20. The method of claim 10 comprising computing coordinates of the centroids of the detected footprints wherein the centroids define the positions of the package units on the infeed conveyor segment.

21. The method of claim 10 comprising rotating the images to a non-oblique orientation relative to the conveying direction before cropping the images.

22. The method of claim 10 comprising preprocessing the cropped images in parallel before classifying the cropped images to format the cropped images for classifying.

23. A conveyor system comprising:
   an infeed conveyor segment conveying package units downstream in a conveying direction at a conveying speed;
   a footprint detector disposed at a detection position along the infeed conveyor segment;
   a camera disposed along the infeed conveyor segment downstream of the detection position to capture an image of a capture area on the infeed conveyor segment;
   a sorting conveyor segment receiving package units from the infeed conveyor segment and selectively sorting the package units to multiple destinations;
   a control processor executing program instructions to:
      operate the footprint detector to detect the footprints of the package units advancing past the detection position in the conveying direction;
      control the sorting conveyor segment and the infeed conveyor segment;
   a classification processor in communication with the control processor and executing program instructions to:
      calculate the positions of each of the package units on the infeed conveyor segment as they advance along the conveyor from their footprints detected passing the detection position;
      control the camera to capture an image of one or more of the package units when the calculated position of one or more of the package units lies within a target zone in the capture area on the infeed conveyor segment to produce an image of the one or more of the package units within the capture area;
      crop the image into one or more cropped images, each cropped image corresponding to one of the one or more package units within the capture area;
      use artificial intelligence to classify the cropped images into a plurality of classifications by assigning one of the classifications to each of the one or more package units;
   wherein the control processor controls the sorting conveyor segment to sort each of the one or more package units to a destination depending on the package unit's classification.

24. A conveyor system as claimed in claim 23 wherein the classification processor classifies the cropped images in a neural network trained to recognize various package units and sends the classifications to the control processor.

25. A conveyor system as claimed in claim 23 wherein the control processor includes a virtual or separate programmable logic controller to control the sorting conveyor segment and the infeed conveyor segment.

26. A conveyor system as claimed in claim 23 wherein the classification processor is a multi-core processor having multiple cores executing the program instructions in parallel.

* * * * *